(12) United States Patent
Topart

(10) Patent No.: US 9,022,418 B2
(45) Date of Patent: May 5, 2015

(54) INTERIOR TRIM COMPONENT FOR MOTOR VEHICLE, ADAPTED FOR COVERING AN AIRBAG

(71) Applicant: Faurecia Interieur Industrie, Nanterre (FR)

(72) Inventor: Geoffroy Topart, Beauvais (FR)

(73) Assignee: Faurecia Interieur Industrie, Nanterre (FR)

( * ) Notice: Subject to any disclaimer, the term of this patent is extended or adjusted under 35 U.S.C. 154(b) by 1 day.

(21) Appl. No.: 14/138,829

(22) Filed: Dec. 23, 2013

(65) Prior Publication Data

US 2014/0183845 A1    Jul. 3, 2014

(30) Foreign Application Priority Data

Dec. 27, 2012   (FR) ..................................... 12 62894

(51) Int. Cl.
  *B60R 21/2165*  (2011.01)
  *B60R 21/215*   (2011.01)
  *B60R 21/213*   (2011.01)
  *B60R 21/205*   (2011.01)
  *B23K 26/36*    (2014.01)
  *B23K 26/40*    (2014.01)

(52) U.S. Cl.
  CPC ............ *B60R 21/213* (2013.01); *B60R 21/215* (2013.01); *B60R 21/2165* (2013.01); *B60R 21/205* (2013.01); *B23K 26/367* (2013.01); *B23K 26/404* (2013.01); *B23K 26/4065* (2013.01)

(58) Field of Classification Search
  CPC .. B60R 21/205; B60R 21/215; B60R 21/2165

USPC ................................................ 280/728.3, 732
  See application file for complete search history.

(56) References Cited

U.S. PATENT DOCUMENTS

| 5,316,822 | A | * | 5/1994 | Nishijima et al. | ............ 428/138 |
| 5,390,950 | A | * | 2/1995 | Barnes et al. | ............. 280/728.3 |
| 5,458,361 | A | * | 10/1995 | Gajewski | ................. 280/728.3 |
| 5,524,923 | A | | 6/1996 | Henseler | |
| 5,941,557 | A | * | 8/1999 | Mullins et al. | ............. 280/728.3 |

(Continued)

FOREIGN PATENT DOCUMENTS

| DE | 10 2006 062642 B3 | 8/2008 |
| EP | 0646500 A1 | 9/1994 |

(Continued)

OTHER PUBLICATIONS

International Search Report from related International Application No. PCT/FR2012/62894 report dated Aug. 13, 2013.

*Primary Examiner* — Paul N Dickson
*Assistant Examiner* — Barry Gooden, Jr.
(74) *Attorney, Agent, or Firm* — Miller, Matthias & Hull LLP

(57) ABSTRACT

The present invention relates to an interior trim component for a motor vehicle, in particular a dashboard, adapted for covering an airbag. The trim component is adapted to break along a main weakening line during deployment of the airbag, said trim component comprising an inside area relative to the main weakening line which defines a flap intended to extend over the airbag. The trim component comprises a notched element comprising a plurality of disjoint notches following one another along the main weakening line and having a generally concave shape relative to the inside area.

9 Claims, 3 Drawing Sheets

(56) References Cited

U.S. PATENT DOCUMENTS

| | | | |
|---|---|---|---|
| 5,961,143 A * | 10/1999 | Hlywka et al. | 280/728.3 |
| 6,224,090 B1 * | 5/2001 | Lutze et al. | 280/728.3 |
| 6,402,189 B1 * | 6/2002 | Gray et al. | 280/728.3 |
| 6,692,019 B2 * | 2/2004 | Sommer | 280/732 |
| 6,709,007 B2 * | 3/2004 | Gray et al. | 280/728.3 |
| 6,918,609 B1 * | 7/2005 | Friery et al. | 280/728.1 |
| 6,976,701 B2 * | 12/2005 | Gray et al. | 280/728.3 |
| 7,014,209 B2 * | 3/2006 | Muller et al. | 280/728.3 |
| 7,063,349 B2 * | 6/2006 | Takahashi | 280/728.2 |
| 7,073,817 B2 * | 7/2006 | Rogers et al. | 280/728.2 |
| 7,188,861 B2 * | 3/2007 | Ono | 280/728.3 |
| 7,384,060 B2 * | 6/2008 | Bisognin et al. | 280/728.3 |
| 7,425,018 B2 * | 9/2008 | Suwama et al. | 280/728.3 |
| 7,497,463 B2 * | 3/2009 | Kaulbersch et al. | 280/728.3 |
| 7,625,004 B2 * | 12/2009 | Geltinger et al. | 280/728.3 |
| 7,976,057 B2 * | 7/2011 | Evans et al. | 280/728.3 |
| 7,980,587 B2 * | 7/2011 | Chen et al. | 280/728.3 |
| 8,123,247 B2 * | 2/2012 | Chen et al. | 280/728.3 |
| 8,246,075 B2 * | 8/2012 | Gaumann et al. | 280/728.3 |
| 8,517,416 B2 * | 8/2013 | Lesnik | 280/728.3 |
| 8,567,814 B2 * | 10/2013 | Crittenden | 280/728.3 |
| 8,651,514 B2 * | 2/2014 | Zhang | 280/728.3 |
| 8,672,344 B2 * | 3/2014 | Wagner et al. | 280/728.3 |
| 2002/0153710 A1 | 10/2002 | Gray et al. | |
| 2002/0195800 A1 * | 12/2002 | Florsheimer | 280/728.3 |
| 2003/0047916 A1 * | 3/2003 | Sun et al. | 280/728.3 |
| 2004/0164531 A1 * | 8/2004 | Riha et al. | 280/732 |
| 2005/0184488 A1 * | 8/2005 | Yasuda et al. | 280/728.3 |
| 2006/0186650 A1 * | 8/2006 | Kuwano et al. | 280/732 |
| 2006/0220354 A1 * | 10/2006 | Geltinger et al. | 280/728.3 |
| 2006/0249931 A1 * | 11/2006 | Nishijima et al. | 280/728.3 |
| 2006/0267314 A1 * | 11/2006 | Yasuda et al. | 280/728.3 |
| 2011/0233904 A1 * | 9/2011 | Chen et al. | 280/728.3 |

FOREIGN PATENT DOCUMENTS

| | | |
|---|---|---|
| EP | 1601553 A2 | 7/2005 |
| EP | 2 233 372 A1 | 9/2010 |
| JP | H09 52567 A | 2/1997 |

* cited by examiner

INTERIOR TRIM COMPONENT FOR MOTOR VEHICLE, ADAPTED FOR COVERING AN AIRBAG

CROSS-REFERENCE TO RELATED APPLICATIONS

This application claims priority under the Paris Convention to the French Patent Application No. 12 62894, filed on Dec. 27, 2012.

FIELD OF THE INVENTION DISCLOSURE

1. Field of the Invention

The present invention relates to an interior trim component for a motor vehicle, in particular a dashboard, adapted for covering an airbag.

2. Background of the Invention Disclosure

Already known to the state of the art is an interior trim component for a motor vehicle, in particular a dashboard, adapted for covering an air bag, said trim component being adapted to break along a main weakening line during deployment of the airbag, said trim component comprising an inside area relative to the main weakening line which defines a flap intended to extend over the airbag.

Document DE 10 2006 062 642 B3 describes an example of such an interior trim component for a motor vehicle. Specifically, document DE 10 2006 062 642 B3 describes a dashboard covering an airbag. The dashboard comprises multiple elements forming superimposed layers. One of these elements forms the dashboard body and comprises a plurality of circular marks which form a weakening line. The dashboard defines a flap intended to extend over the airbag. When a force acts on the flap, the dashboard breaks along the weakening line and releases the airbag. This type of interior trim component is already used in vehicles and is satisfactory. However, to reduce the risk of injury to the vehicle occupants while enhancing the appearance of such a component to a vehicle passenger, the present invention aims to improve it.

SUMMARY OF THE DISCLOSURE

To this end, according to the invention, a trim component such as above-described comprises a notched element comprising a plurality of disjoint notches following one another along said main weakening line and having a elongated generally concave shape when viewed from the inside area of the main weakening line.

With these features, the trim component breaks apart more easily when a force releasing the airbag is exerted, and in particular provides better consistency (reproducibility) in the force required to release the airbag by following the main weakening line more closely. Passenger safety is therefore increased. Indeed, the shape of the notches ensures continuity in the breaking motion along the pre-established break line and thus withdraws any risk of the trim component breaking beyond this main weakening line. In addition, the plurality of notches defines a discrete pattern that is substantially invisible to a passenger in the vehicle, and the discontinuity of the notches prevents the notches from "opening" or deviating during the lifetime of the vehicle, thus preserving the aesthetic appearance of the flap.

In preferred embodiments of the invention, one or more of the following arrangements may be used:

said main weakening line comprises a main portion that is substantially U-shaped comprising a base, a first side arm, and a second side arm, said first and second side arms being opposite to one another, and said plurality of notches is located at least in an interface area located in the vicinity of the base and the first side arm. The orientation of the notches in the interface area located in the vicinity of the base and the first side arm ensures continuity in the breaking motion along the weakening line and limits the risk of deviation;

the U-shaped main portion of the main weakening line extends between a first weakening end which is part of the first arm and a second weakening end which is part of the second arm, said notches each include a first notch end and a second notch end, the first notch end being closer to the first weakening end than the second notch end, and said notches each extend tangentially to the main weakening line in the vicinity of their first end;

the plurality of disjoint notches extends all the way to the first weakening end;

the main weakening line further comprises an interface portion beveled extending between the first side arm and the base, and into which said main portion extends. The interface portion ensures a simplified propagation of the breaking motion;

each of the notches comprises a first segment and a second segment forming between them in the inside area an obtuse angle that is strictly less than 180 degrees, and preferably between 105 degrees and 165 degrees. The notches are thus easily created on the trim component, and the angle between the first and second segments is particularly advantageous for achieving a non-abrupt change in the direction of the breaking motion;

said plurality of notches includes an interface notch comprising a third segment, the first segment being arranged between the second segment and third segment, and the first segment and third segment forming a non-zero angle relative to one another and both extending along the main weakening line. The interface notch created by the three segments here again allows achieving a non-abrupt change in the direction of the breaking motion;

the notches have an identical width and an identical depth in the first segment and in the second segment. They are thus easily realized by known production methods;

the main weakening line is symmetric with respect to a line median plane and said plurality of notches is arranged symmetrically with respect to said line median plane along said main weakening line. This symmetry ensures regularity in the breaking motion in two different directions;

the trim component further comprises a dashboard body and the notched element is formed by a motor vehicle dashboard skin covering the dashboard body.

BRIEF DESCRIPTION OF THE DRAWINGS

Other features and advantages of the invention will become apparent from the following description of one of its embodiments, given by way of non-limiting example with reference to the accompanying drawings.

In the drawings.

In the various figures, the same references are used to refer to identical or similar elements.

DETAILED DESCRIPTION OF THE DISCLOSURE

Figure 1:
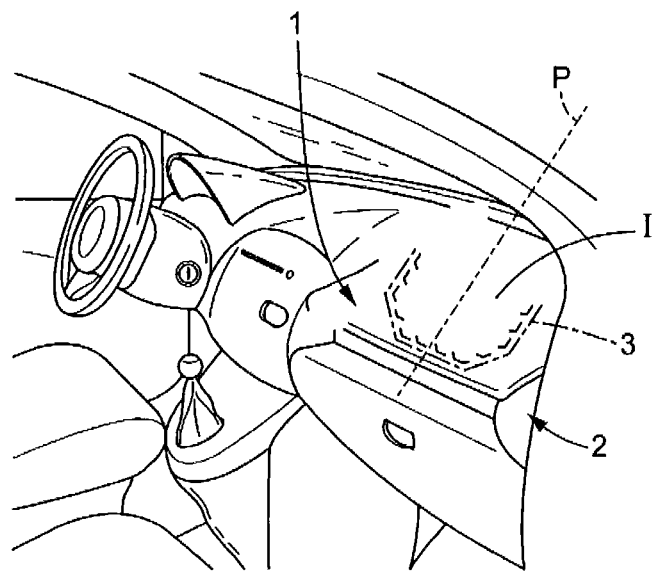
FIG. 1 is a schematic perspective view of passenger compartment of a vehicle equipped with an interior trim component according to the invention.

FIG. 1 schematically represents the interior of a vehicle equipped with an interior trim component.

The trim component is a dashboard 1 comprising a notched element 100. In alternative embodiments, the interior trim component of the vehicle could be a door panel, a roof lining, a seat, or any other type of trim element equipping the inside of a vehicle.

The notched element 100 of the dashboard comprises an outside surface, possibly visible to a passenger of the vehicle and facing the vehicle seating area, and an inside surface that is opposite the outside surface. As shown in FIG. 1, the notched element 100 of the dashboard comprises a plurality of disjoint notches following one another 10 along a main weakening line 3, also called the line of least resistance.

The main weakening line 3 forms a general U-shape and defines an inside area I relative to the main weakening line 3, which forms a flap covering the airbag. When a force is applied, the airbag 2 deploys and the notched element 100 of the dashboard breaks along the main weakening line 3.

The main weakening line comprises a main portion that is substantially U-shaped with a base 31 and two side arms 32, 33. The side arms 32, 33 are opposite each other, connected by the base, and the base and the two side arms 32, 33 define the inside area I. The U-shaped main portion extends between a first weakening end 34 and a second weakening end 35. The first weakening end 34 is part of the first arm 32, while the second weakening end 35 is part of the first arm 33. In the figure, the main weakening line is symmetric about a line median plane P.

Figure 2:
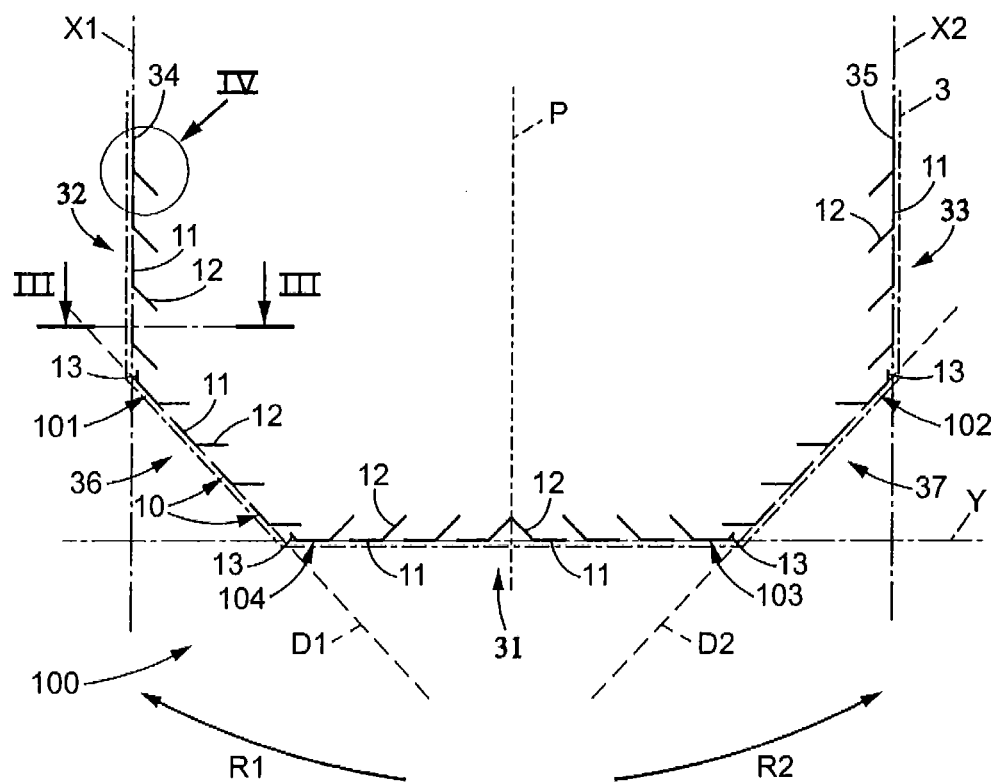
FIG. 2 is a schematic view of the main weakening line of the interior trim component of FIG. 1.

In the embodiment illustrated in FIG. 2, the main weakening line 3 also comprises a first interface portion 36 beveled extending between the first side arm 32 and the base 31. Symmetrically, the main weakening line 3 comprises a second interface portion 37 beveled extending between the second side arm 33 and the base 31. In other words, the base 31 extends in a transverse direction Y, the first arm extends in a first lateral direction X1, and the first interface portion (also called the extension portion) extends in a first extension direction D1. The first extension direction D1 forms a non-zero angle with the first lateral direction X1 and with the transverse direction Y. Preferably, the second side arm extends in a second lateral direction X2 parallel to the first lateral direction X1 and perpendicular to the transverse direction Y.

In another embodiment, not shown, the first lateral direction X1 and the second lateral direction X2 may not be parallel and may thus form a main weakening line that is substantially trapezoidal in shape. Similarly to the above, the second interface portion (also called the extension portion) 37 extends in a second extension direction D2 forming a non-zero angle respectively with the first and second lateral directions X1, X2, the transverse direction Y, and the first extension direction D1.

The main weakening line 3 has been described as being U-shaped, but equally advantageously it may have the shape of an H, an I, two U facing each other with a common portion or forming an envelope or any other shape appropriate for the opening of the flap covering the airbag.

Each notch 10 has an elongated and substantially concave shape in the direction of the inside area I defined by the break line. More specifically, each notch has a shape that substantially curves inwards relative to the inside area I. In other words, each notch angles towards the inside area I. Each notch comprises first and second notch ends, and the first notch end is tangent to the main weakening line 3, while the second notch end is located within the inside area I. The second notch end is closer to the base 31 than the first notch end. For example, each notch extends at least partially in a direction which is toward the inside area I. In addition, each notch 10 also extends partially along the main weakening line 3.

Figure 4:
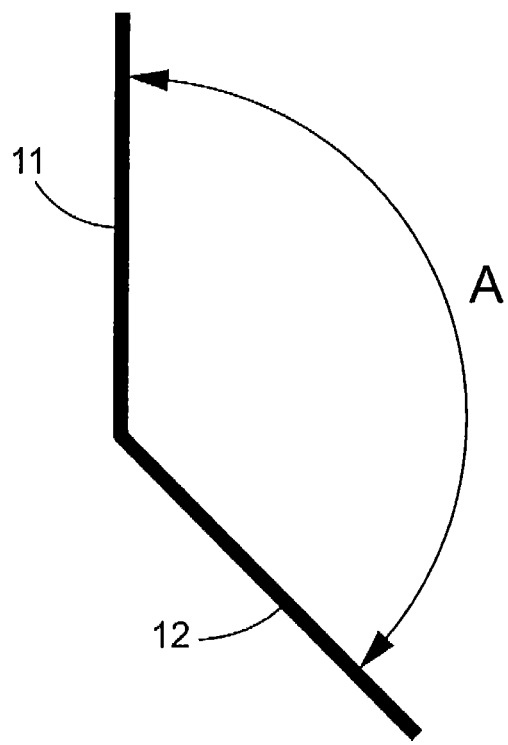
FIG. 4 is an enlarged view of region IV of FIG. 2.

More particularly, as shown in FIGS. 2 and 4, each notch 10 comprises a first segment 11 and second segment 12. The first and second segment together form in the inside area I a non-zero obtuse angle A that is strictly less than 180°. Preferably, the angle A is between 105° and 165°, for example about 135°. The first segment 11 is connected to the second segment 12 by a protruding edge.

Alternatively, the first segment 11 may be connected to the second segment 12 by a curved portion. The first segment 11 extends along the main weakening line, while the second segment 12 is located within the inside area I.

As represented in FIG. 2, the notches lie in succession along the break line, between the first and second weakening ends 34, 35. More particularly, in the region of the first arm 32, the notches 10 have a first segment 11 extending substantially along the first lateral direction X1 and a second segment 12 extending substantially in a first propagation direction. As shown in FIG. 2, the first propagation direction is parallel to the first extension direction D1. The notches in the vicinity of the second arm 33 have a first segment 11 extending substantially along the second lateral direction X2 and a second segment 12 extending substantially in a second propagation direction.

As represented in FIG. 2, the second propagation direction is parallel to the second extension direction D2. The notches in the region of the base 31, between the first intermediate portion 36 and the point of intersection of the line median plane P and the weakening line, have a first segment 11 extending substantially in the transverse direction Y and a second segment 12 extending in a direction, for example a direction parallel to the second propagation direction D2.

By symmetry relative to the line median plane P, the notches between the second intermediate portion 37 and the point of intersection of the line median plane P and the break line 11 have a first segment extending substantially in the transverse direction Y and a second segment 12 extending in a direction that is for example parallel to the first propagation direction D1. As for the notches in the region of the first interface portion 36, they have a first segment 11 extending in the extension direction D1 and a second segment 12 extending in the transverse direction Y.

In a variant embodiment, the plurality of notches 10 is located on the first intermediate portion 36 or on the second intermediate portion 37 or in the vicinity of the first intermediate portion 36 or in the vicinity of the second intermediate portion 37.

In the case represented here, the plurality of notches 10 comprises a first interface notch 101, a second interface notch 102, a third interface notch 103, and a fourth interface notch 104. The first, second, third and fourth interface notches 101, 102, 103, 104 are respectively arranged between the first arm 32 and the first interface portion 36, between the second arm 3'3 and the second interface portion 37, between the second interface portion 37 and the base 31, and between the base 31 and the first interface portion 36.

Each interface notch, as represented in FIG. 2, comprises a third segment 13, the first segment 11 being arranged between the second segment 12 and the third segment 13. The first and third segments 11, 13 form a non-zero angle relative to each other, preferably an obtuse angle strictly less than 180°. For example, the third segment 13 of the first interface notch 101 extends in the first lateral direction X1, the third segment 13 of the second interface notch 102 extends in the second lateral direction X2, the third segment 13 of the third interface notch 103 extends in the second extension direction D2, and the third segment 13 of the fourth interface notch 104 extends in the first extension direction D1.

The notches 10 are made in the inside area of the notched dashboard element 100. The notches 10 are preferably made by a temperature-controlled heated blade that is pressed into the notched dashboard element 100. The blade is discontinuous to correspond to the notches described above and represented in FIG. 2. Alternatively, the notches 10 are made using a laser beam or a similar method. The notches are made within the thickness of the dashboard element and have a constant width and depth along their entire length.

Figure 3:
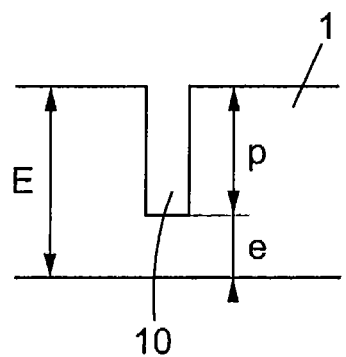
FIG. 3 is an enlarged sectional view along line III-III of FIG. 2.

FIG. 3 schematically represents a portion of the dashboard element (or notched element) 100 in a sectional view. The notched element has a total thickness E and the notch has a depth (or thickness) p. The depth p is of course less than the total thickness E. In addition, a residual thickness e is defined by the difference between the total thickness E and the depth p. Preferably, the depth p represents between 50% and 100% of the total thickness E, advantageously between 70% and 90% of the total thickness E. As represented in FIG. 3, the residual thickness e is not zero. In an alternative embodiment, the residual thickness e could be zero and the depth p of the notch is the same as the total thickness of the dashboard. Advantageously, the residual thickness e is less near the line median plane than near the first and second side arms 32, 33. Thus, the breakage of the trim component preferably occurs at the line median plane P and propagates along the main weakening line to the first and second weakening ends 34, 35 as represented in FIG. 2 by arrows R1 and R2.

Figure 7:
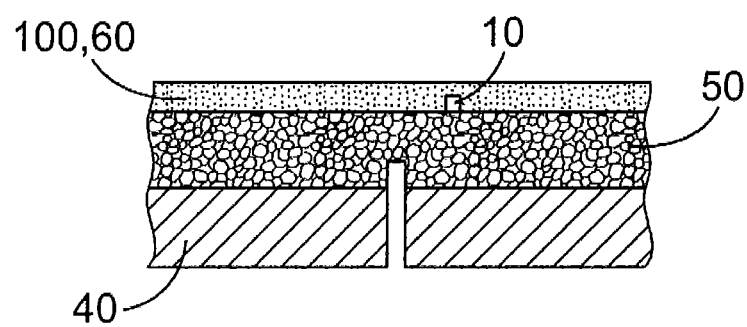
FIG. 7 is a schematic sectional view of a "padded" dashboard.

In a preferred embodiment, and as represented in FIG. 7, the dashboard is of the "padded" type and comprises a dashboard body 40 forming a rigid support layer, a foam layer 50, and a skin 60 covering the foam layer 50. The airbag safety system 2 (see FIG. 1) is housed under the dashboard body 40. The dashboard body is then for example made by injection molding and is made of thermoplastic material, for example such as polypropylene PP with or without reinforcing fibers or inorganic filler depending on the rigidity desired. The foam layer is made of polyurethane for example, and the dashboard element (or skin) is for example of polyvinyl chloride (PVC), thermoplastic polyolefin (TPO), polyurethane (PU), leather, or leather substitute. In this embodiment, the notched element 100 corresponds to the skin 60. In the embodiment illustrated, the dashboard body has a continuous notch. However, in alternative embodiments, the dashboard body could comprise the notched element 100, as described above, in addition to or instead of the skin 60.

Figure 5:
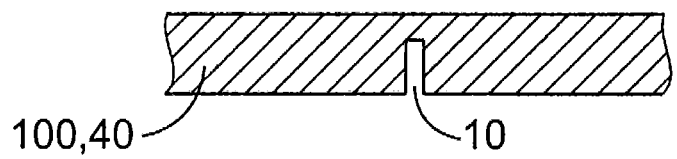
FIG. 5 is a schematic sectional view of an "injection molded" dashboard.

In a first variant embodiment, and as represented in FIG. 5, the dashboard is an "injection molded" dashboard consisting of a dashboard body 40 which constitutes the sole element of the dashboard. In this variant embodiment, the notched element 100 corresponds to the dashboard body 40.

Figure 6:
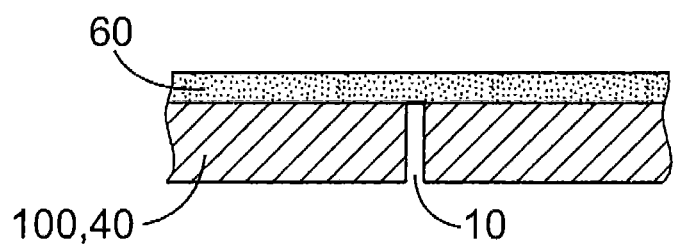
FIG. 6 is a schematic sectional view of a "thermo coated" dashboard.

In a second variant embodiment, and as represented in FIG. 6, the dashboard is a "thermo coated" dashboard comprising a dashboard body 40, the dashboard further comprising a self-splitting skin 60 covering the dashboard body. In this second variant, the notched element 100 corresponds to the dashboard body 40. The residual thickness e is zero and the notch depth p is the same as the total thickness E of the dashboard body. In this case, the notch passes through the thickness of the notched element and extends from the inside surface to the outside surface of said element. This variant embodiment is advantageous in the case of a skin made of "self-sealing" material, for example PVC, covering the dashboard body.

Of course, the invention is not limited to the embodiment described by way of illustration and not of limitation. In particular, instead of being formed of segments, the notches may have an elongated shape that is entirely or partially curved, of constant or variable curvature, instead of being formed of straight sections as illustrated in FIGS. 2 and 4. However, in the invention, the notches do not have any reversal of curvature (or inflection point).

The invention claimed is:

1. An interior trim component for a motor vehicle, in particular a dashboard, adapted for covering an airbag, said trim component being adapted to break along a main weakening line during deployment of the airbag, said trim component comprising an inside area relative to the main weakening line which defines a flap intended to extend over the airbag,
   wherein the trim component comprises a notched element having a plurality of disjoint notches following one another along said main weakening line and each notch being angled towards the inside area,
   wherein:
      said main weakening line comprises a main portion that is substantially comprising a base, a first side arm, and a second side arm, said first and second side arms being opposite to one other, and
      said plurality of notches are located at least in an interface area located in a vicinity of the base and the first side arm,
   wherein:
      the main portion of the main weakening line extends between a first weakening end which is part of the first side arm and a second weakening end which is part of the second side arm,
      said plurality of notches each include a first notch end and a second notch end, the first notch end being closer to the first weakening end than the second notch end, and
      the main weakening line extending parallel to said plurality of notches in a vicinity of the first notch end.

2. The trim component according to the claim 1, wherein said plurality of disjoint notches extend all the way to the first weakening end.

3. The trim component according to claim 1, wherein the main weakening line further comprises an interface portion being beveled extending between the first side arm and the base, and into which said main portion extends.

4. The trim component according to claim 1, wherein the main weakening line is symmetric with respect to a line median plane and said plurality of notches are arranged symmetrically with respect to said line median plane along said main weakening line.

5. The trim component according to claim 1, further comprising a dashboard body and the notched element is formed by a motor vehicle dashboard skin covering the dashboard body.

6. The trim component according to claim 1, wherein each of the plurality of notches comprises a first segment and a second segment forming between them in the inside are an obtuse angle that is between 105 degrees and 165 degrees.

7. The trim component according to claim 1, wherein each of the plurality of notches comprises a first segment and a second segment forming between them in the inside area an obtuse angle that is strictly less than 180 degrees.

8. The trim component according to claim 7, wherein:
   said plurality of notches includes an interface notch comprising a third segment, the first segment being arranged between the second segment and the third segment, and
   the first segment and the third segment forming a non-zero angle relative to one another and both extending along the main weakening line.

9. The trim component according to claim 7, wherein the plurality of notches have an identical width and an identical depth in the first segment and in the second segment.

* * * * *